(12) United States Patent
Basting et al.

(10) Patent No.: US 9,849,907 B2
(45) Date of Patent: Dec. 26, 2017

(54) DRIVER ASSISTANCE SYSTEM FOR A VEHICLE

(71) Applicant: GM GLOBAL TECHNOLOGY OPERATIONS LLC, Detroit, MI (US)

(72) Inventors: Jochen Basting, Eltville (DE); Steffen Stauder, Bodenheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 15/041,749

(22) Filed: Feb. 11, 2016

(65) Prior Publication Data
US 2016/0229450 A1 Aug. 11, 2016

(30) Foreign Application Priority Data
Feb. 11, 2015 (DE) .................. 10 2015 001 802

(51) Int. Cl.
*B62D 5/00* (2006.01)
*B62D 6/00* (2006.01)
(Continued)

(52) U.S. Cl.
CPC .......... *B62D 5/008* (2013.01); *B62D 5/0472* (2013.01); *B62D 6/008* (2013.01); *B62D 15/025* (2013.01); *B60W 30/182* (2013.01); *B62D 5/04* (2013.01); *B62D 5/0463* (2013.01); *B62D 5/08* (2013.01); *B62D 6/02* (2013.01); *B62D 6/10* (2013.01)

(58) Field of Classification Search
CPC ... B62D 5/04; B62D 6/00; B62D 5/08; B62D 6/02; B62D 6/10; B62D 5/0472; B62D 6/008; B62D 5/0463; B62D 5/008; B60W 30/182; B60W 50/12; B60W 10/10; G08B 6/00; G06F 17/00
See application file for complete search history.

(56) References Cited

U.S. PATENT DOCUMENTS 6,718,243 B1 4/2004 Yao et al.
8,090,502 B2 1/2012 Brosig et al.
(Continued)

FOREIGN PATENT DOCUMENTS

DE 102006043122 A1 3/2008
DE 102006053029 A1 5/2008
(Continued)

OTHER PUBLICATIONS

Great Britain Patent Office, Great Britain Search Report for Great Britain Application No. 1600936.7, dated Jul. 6, 2016.
(Continued)

*Primary Examiner* — Behrang Badii
(74) *Attorney, Agent, or Firm* — Lorenz & Kopf, LLP

(57) ABSTRACT

A driver assistance system for a vehicle includes a steering assistance system for autonomously generating steering commands, a first actuating drive for adjusting a steering angle on a steerable wheel of the vehicle corresponding to the steering commands and a steering wheel that is rotatable coupled to the steering angle by a second actuating drive. The steering assistance system actuates the second actuating drive in order to favor a low-frequency component of a frequency spectrum of changes of the steering angle in the rotation of the steering wheel than a high-frequency component of the frequency spectrum.

16 Claims, 1 Drawing Sheet

(51) Int. Cl.
*B62D 15/02* (2006.01)
*B62D 6/02* (2006.01)
*B62D 5/04* (2006.01)
*B62D 6/10* (2006.01)
*B60W 30/182* (2012.01)
*B62D 5/08* (2006.01)

(56) References Cited

U.S. PATENT DOCUMENTS

| | | |
|---|---|---|
| 8,489,281 B2 | 7/2013 | Reichel et al. |
| 8,626,394 B2 * | 1/2014 | Kezobo ............... B62D 5/0472 180/443 |
| 8,880,287 B2 | 11/2014 | Lee et al. |
| 9,446,789 B2 | 9/2016 | Tsubaki et al. |
| 2004/0193374 A1 | 9/2004 | Hac et al. |
| 2013/0041557 A1 | 2/2013 | Endo et al. |
| 2014/0365077 A1 * | 12/2014 | Kariatsumari ....... B62D 5/0472 701/41 |
| 2015/0259007 A1 | 9/2015 | Di Cairano et al. |
| 2016/0325776 A1 * | 11/2016 | Yamamoto ........... B62D 5/0463 |

FOREIGN PATENT DOCUMENTS

| | | |
|---|---|---|
| DE | 102011086897 A1 | 5/2013 |
| DE | 102012111258 A1 | 5/2015 |
| EP | 1845007 A1 | 10/2007 |
| EP | 2088059 A1 | 8/2009 |

OTHER PUBLICATIONS

German Patent Office, German Search Report for German Application No. 102015001802.7, dated Oct. 12, 2015.

\* cited by examiner

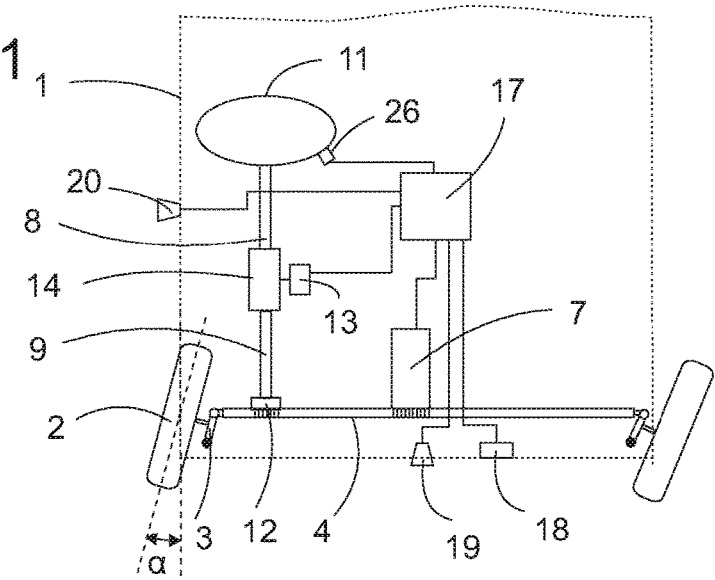
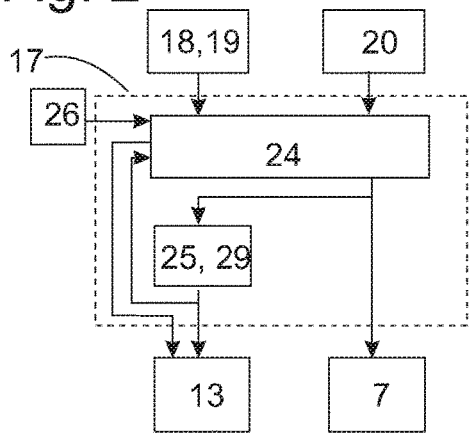
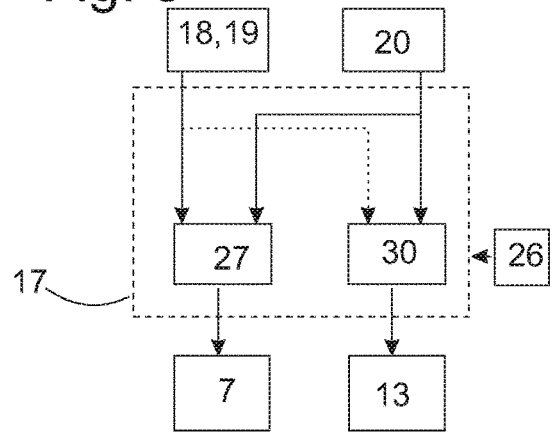
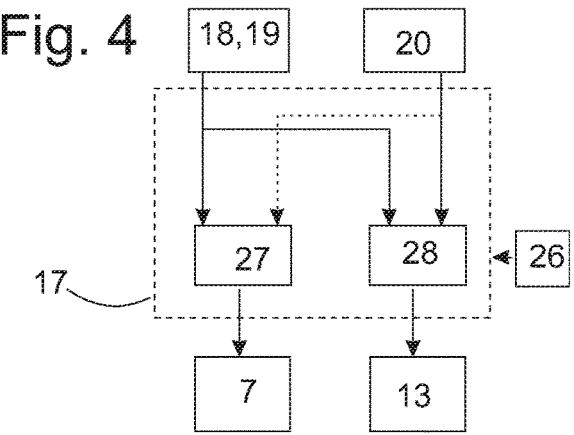

DRIVER ASSISTANCE SYSTEM FOR A VEHICLE

CROSS-REFERENCE TO RELATED APPLICATION

This application claims priority to German Patent Application No. 102015001802.7, filed Feb. 11, 2015, which is incorporated herein by reference in its entirety.

TECHNICAL FIELD

The present disclosure pertains to a driver assistance system for a vehicle with a steering assistance system for the autonomous generating of steering commands.

BACKGROUND

DE 10 2010 053 156 A1 describes a driver assistance system for the autonomous control of a motor vehicle in a collision hazard. The driver assistance system includes a source of information for detecting an object in the surroundings of the motor vehicle, a control device for generating steering, commands, which is connected to the source of information, and a first actuating drive for adjusting a steering angle on a steerable wheel of the motor vehicle corresponding to the steering commands. When an object is detected, the control device generates a steering command, which leads to a rapid evasive movement of the vehicle. When the driver assistance system is inactive, a superimposition gear couples a rotation of the steering wheel with given transmission ratio to a pivot movement of the steerable wheels. When the driver assistance system is active and activates the first actuating drive in order to evade an object, it simultaneously activates a second actuating drive on the superimposition gear so that the rotary movement of the steering wheel becomes less than when the driver would steer the evasive maneuver manually, without intervention of the driver assistance system, or the steering wheel may even remain unmoved. This is to eliminate the risk that the driver's hands are injured when the driver assistance system carries out a brief steering intervention that is not expected by the driver.

New types of driver assistance systems are to relieve the driver from steering not only in exceptional situations that are closely limited in time but also over extended periods of time of uncertain duration, for example when travelling in convoy or on the highway. In order to fulfill this task, a driver assistance system has to continuously pick up information regarding the course of the road ahead of the vehicle, the position of the vehicle on the road and the correct the travelling direction with the help of this information. The advantage of the driver assistance systems with respect to the manual steering is that they are able to process the available information substantially faster than a human driver and can perform corrective steering movements with a substantially higher frequency than the same. For safety reasons, these frequent steering movements are undesirable: a trembling of the steering wheel resulting from this rather gives the vehicle occupants a feeling of insecurity.

SUMMARY

In accordance with the present disclosure, a driver assistance system is provided which offers a way out from this contradiction. The driver assistance system includes a steering assistance system for the autonomous generating of steering commands, a first actuating drive for adjusting a steering angle on a steerable wheel of the vehicle corresponding to the steering commands and a steering wheel which is rotatable by a second actuating drive coupled to the steering angle. The steering assistance system actuates the second actuating drive in order to more intensely reflect a low-frequency component of a frequency spectrum of changes of the steering angle in the rotation of the steering wheel than a high-frequency component of the frequency spectrum. Accordingly, the driver on the steering wheel will see those movements which he would also carry out considering the road in front of him; minor short-term travelling direction corrections the course of which the driver is unable to detect since he cannot assess the position of the vehicle on the road as quickly and accurately as the driver assistance system, remain hidden to him and can thus not irritate him.

According to a first configuration, a steering knuckle of the steerable wheel, the steering wheel and the second actuating drive are coupled via a superimposition gear and the steering assistance is equipped to activate the second actuating drive in the opposite direction to the changes of the steering angle that occur in the high-frequency component of the frequency spectrum in order to prevent these being transmitted to the steering wheel. The steering assistance system, for this purpose, can include a unit for calculating a set point value of the steering angle and a high-pass filter, the input of which receives the set point value of the steering angle and the output of which is connected to the second actuating drive. The set point value of the steering angle can be directly output to the first actuating drive: however, the steering assistance system could also include a unit for generating steering commands by way of the set point value of the steering angle in order to control the speed of the steering movement by way of a deviation between set point and actual value of the steering angle.

The steering assistance system can be connected to a first source of information for supplying information regarding the course of a road ahead of the vehicle and to a second source of information for supplying information regarding the position of the vehicle relative to a shoulder of the road. Information regarding the course of a road in front of the vehicle mainly contributes to the low-frequency component of the frequency spectrum of changes of the steering angle set point value. Information, which for example relate to the distance of the vehicle from the road shoulder lead to rather high-frequency changes of the steering angle set point value compared with this. When the steering assistance system as described above includes a unit for calculating a set point value of the steering angle and a high-pass filter, the set point value is influenced by the information from both sources and the high-pass filter generates a signal from the set point value, in which the influence of the first source of information is diminished.

Alternatively, the steering assistance system can be divided into two processing branches which receive information from both sources of information. A first processing branch generates the steering commands by way of the information of the first and the second source. A second processing branch for controlling the second actuating drive weights the information of the first source relative to the information of the second source less strongly than the first processing branch ignoring it in an extreme case, so that substantially only those changes of the steering angle which are based on information of the second source are suppressed in the movements of the steering wheel.

According to a second configuration of the present disclosure, the steering assistance is equipped to activate the second actuating drive in the same direction to the changes of the steering angle that occur in the low-frequency component of the frequency spectrum. This is practical in particular with a steer-by-wire steering, in the case of which there is no mechanical coupling between steering angle and steering wheel position and the movements of the steering wheel are solely driven by the second actuating drive. With this configuration, the steering assistance system can also include a unit for calculating a set point value of the steering angle, however, in this case this is connected to a low-pass filter the input of which receives the set point value of the steering angle and the output of which is connected to the second actuating drive. With this second configuration, the steering assistance system can also be connected to a first source of information for supplying information regarding the course of a road ahead of the vehicle and to a second source of information for supplying information regarding the position of the vehicle relative to a shoulder of the road.

As an alternative to the structure described above with a unit for calculating the steering angle set point value and a low-pass filter, the steering assistance system can be divided into a first processing branch, which generates the steering commands by way of the information of the first and of the second source, and a second processing branch for controlling the second actuating drive, which weights the information of the second source relative to the information of the first source less strongly than the first processing branch, ignoring it in an extreme case. High-frequency changes of the steering angle, which are mainly due to the second source, are hardly visible on the steering wheel or not at all.

The first source of information can include a navigation system and/or a camera. The camera can be directed at the road in front of the vehicle in order to supply information regarding its course. The second source of information can include a camera and/or a radar sensor, which supply information regarding the position of the vehicle relative to the shoulder of the road.

With a conventional steering that is not influenced by a steering assistance system, the position of the steerable wheels and that of the steering wheel are in a fixed relationship, i.e. each steering angle of the steerable wheels is assigned exactly one normal position of the steering wheel. However, with the driver assistance system according to the present disclosure, the steering assistance system can cause the position of the steering wheel to deviate from the normal position corresponding to the current steering angle. Once the driver following an autonomous driving operation of the vehicle resumes the control of the steering wheel, such a deviation has to be offset within a short time interval since the travelling direction of the vehicle does not otherwise correspond to that expected by the driver by way of the steering wheel position. For this reason, a normal position of the steering wheel as a function of the steering angle is preset to the driver assistance system and the steering assistance system is connected to a sensor for detecting the steering wheel being touched by the driver and equipped when the steering wheel is touched to gradually reduce a deviation between an actual rotary position of the steering wheel and the normal position.

BRIEF DESCRIPTION OF THE DRAWINGS

The present disclosure will hereinafter be described in conjunction with the following drawing figures, wherein like numerals denote like elements.

FIG. 1 is a schematic top view of a front region of a motor vehicle;

FIG. 2 is a block diagram of the driver assistance system according to a first configuration;

FIG. 3 a block diagram according to a modification of the configuration shown in FIG. 2; and FIG. 4 a block diagram of the driver assistance system according to a second configuration.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

FIG. 1 shows a driver assistance system in a schematic top view in the front region of a motor vehicle 1. A steerable wheel 2 is connected to a track rod 4 via a steering knuckle 3. A first actuating drive 7, for example a conventional power steering system, is connected to the track rod 4. Furthermore, a steering pinion 12, which is fastened to a steering rod 9, meshes with the track rod 4. The steering rod 9 is connected to an output of a superimposition gear 14. An input of the superimposition gear 14 is connected to a steering spindle 8, which carries a steering wheel 11. A superimposition connection of the superimposition gear 14 is driven by a second actuating drive 13. The first and the second actuating drive 7, 13 are activated by a steering assistance system 17. Inputs of the steering assistance system 17 are connected to a navigation device 18, a front camera 19 and a side camera 20 on each vehicle side.

When the steering assistance system 11 is inactive, the second actuating drive 13 is in a blocked state, in which it blocks a rotation of the superimposition connection. As a consequence of this, the superimposition gear 14 transmits rotations of the steering wheel 11 with a fixed transmission ratio to the pinion 12. The first actuating drive 7 simultaneously is in an idle state, in which it does not put up any resistance to a movement of the track rod 4 driven via the pinion 12, or it is used as servo drive which supports the movement of the track rod 4 driven by the pinion 12.

FIG. 2 schematically shows a block diagram of the driver assistance system according to a first configuration of the present disclosure. During autonomous driving, the steering assistance system 17 obtains information regarding the course of the road detected by the navigation device 18 and information detected by the front camera 19 regarding any objects in front of the vehicle 1. From the side cameras 20, the steering assistance system 17 obtains information regarding the position of the vehicle relative to a shoulder of the road. A unit 24 of the steering assistance system 17 continuously calculates by way of this information a set point value of a steering angle $\alpha$ between steerable wheel 2 and vehicle longitudinal axis. When calculating the set point value of the steering angle $\alpha$, information regarding driving parameters such as speed, transverse acceleration and yaw can be included as well. The set point value of the steering angle $\alpha$ is output by the unit 24 as steering command to the first actuating drive 7. The latter then moves the track rod 4 in order to set the steering angle $\alpha$ on the steerable wheels 2.

The information which is continuously included in the calculation of the set point value of the steering angle $\alpha$ leads to a frequency spectrum of time changes of the set point value with a low-frequency component and a high-frequency component. The information of the navigation system 18 and of the front camera 19 concerns the course of a road in front of the vehicle and above all contributes to the low-frequency component. The information of the side cameras 20, compared with this, leads to rather high-frequency changes of the steering angle set point value. High and low-frequency changes control the movement of the track rod 4 and via the same the actual steering angle of the steerable wheels 2. All movements of the track rod 4 are reflected as rotations of the steering spindle 9. If the rotations of the steering spindle 9 were to be transmitted to the steering rod 8 with a fixed transmission ratio, the high-frequency component of the frequency spectrum of rotations of the steering spindle 9 would above all lead to a shaking movement of the steering wheel 11 that is irritating for the driver.

In order to diminish the irritating effects of the high-frequency component of the frequency spectrum of the rotations of the steering spindle 9 on the steering wheel 11, a high-pass filter 25 of the steering assistance system 17 uses the calculated set point value of the steering angle $\alpha$ as input variable. From this, the high-pass filter 25 generates an output signal in which the—relatively low-frequency—influence of the navigation system 18 and of the front camera 19 is diminished. The output of the high-pass filter 25 is connected to the second actuating drive 13. The steering assistance system 17, with the output signal of the high-pass filter 25, activates the second actuating drive 13 in the opposite direction to the changes of the steering angle $\alpha$ that occur in the high-frequency component of the frequency spectrum. The movements of the second actuating driver 13 are superimposition in the superimposition gear 14 to the rotations caused by the steering spindle 9 and largely offset their high-frequency component. Because of this, mainly the low-frequency changes of the set point value of the steering angle $\alpha$ are reflected on the steering wheel 11. The rotations of the steering wheel which the driver is able to see thus substantially correspond to those which the driver would himself perform taking into account the road in front of him, thus showing him that the driver assistance system operates correctly without unsettling him through rapid movements because of which he is unable to detect.

In the case of a conventional steering that is not influenced by a steering assistance system, the position of the steerable wheels 2 and that of the steering wheel 11 are in a fixed relationship, i.e. every steering angle $\alpha$ of the steerable wheels 2 is assigned exactly one normal position of the steering wheel 11. In the case of the driver assistance system according to the present disclosure, the second actuating drive 13 can, by it being deflected by a rest position, bring about a deviation of the position of the steering wheel 11 from the normal position corresponding to the current steering angle $\alpha$. When the driver following an autonomous driving operation of the vehicle resumes the control of the steering wheel 11, the steering assistance system 17 has to offset this deviation within a short time interval since otherwise the travelling direction of the vehicle does not correspond to that expected by the driver by way of the steering wheel position. The unit 24 is therefore connected to a sensor 26, which detects a touching of the steering wheel 11 by the driver. When the unit 24 by way of the data of the sensor 26 detects that the driver touches the steering wheel 11, it puts the first actuating drive 7 into the idle state and activates the second actuating drive 13 in order to return it into the position of rest, thus gradually bringing the steering wheel 11 into the normal position. In order to return it into the position of rest, the steering assistance system 17 causes the actuating drive 13 to rotate preferentially with a fixed angular velocity. Accordingly, the time pending the reaching of the position of rest can vary depending on the dimension of the deflection of the actuating drive 13, but it can be excluded that the driver is being surprised by the speed with which the expected and actual travelling direction are matched to one another and fails to adequately readjust the steering wheel position.

FIG. 3 shows a block diagram of the driver assistance system according to a modification of the first configuration of the present disclosure. The steering assistance system 17 in this case is divided into two parallel processing branches 27, 28. The first processing branch 27 corresponds to the unit 24 of the first configuration, exactly like these it generates steering commands by way of information of the navigation device 18 and of the cameras 19, 20, which it outputs to the first actuating drive 7.

The high pass filter 25 shown in FIG. 2 is omitted here, instead the second processing branch 28 relates to information from the side cameras 20 and by way of this information activates a deflection of the second actuating drive 13 from its position of rest. Since, here, too, information which make short-term directional corrections of the vehicle necessary, are substantially supplied by the lateral cameras 20, while the information of the navigation device 18 and of the camera 19 rather bring about long-term directional changes, the steering commands directed at the first actuating drive 7 describe both high and low-frequency changes of the steering angle $\alpha$, while the commands to the actuating drive 13 are predominantly described high-frequency actuating movements. The high-frequency rotary movements of the actuating drive 13 resulting from this compensate a high-frequency component of the movements of the steering spindle 9 in the superimposition gear 14, so that the same do not become detectable on the steering wheel 11.

As is shown by a dashed line in FIG. 3, it can be provided according to a modification that the processing branch 28 also receives information of the navigation device 18 and of the camera 19. However, these are weighted less strongly than in the processing branch 27 so that they are not fully compensated and remain visible on the steering wheel 11.

When the sensor 26 indicates the steering wheel 11 being touched by the driver, the processing branch 27 terminates the control of the actuating drive 7 putting the same into an idle state. In the case that the second actuating drive 13 is deflected out of its position of rest, the second actuating drive 13 returns the same into the rest position with predetermined angular velocity blocking it in the same.

In a second configuration of the present disclosure, the driver assistance system is constructed as a steer-by-wire steering. This configuration is not shown in a separate figure since it differs from the construction of FIG. 1 only in that the steering spindle 9 and the steering pinion 12 in FIG. 1 are omitted, so that there is no mechanical coupling between steering angle and steering wheel 11 and that the actuating drive 13 and the steering wheel 11 instead are coupled to one another by the superimposition gear with fixed transmission ratio. The movement of the steering wheel 11 is solely driven by the second actuating drive 13.

As in the first configuration, a set point value of the steering angle $\alpha$ is continuously calculated in the unit 24 and output to the first actuating drive 7 in the form of a steering command. Instead of the high-pass filter 25, the input of a low-pass filter 29 (see FIG. 2) receives the set point value of the steering angle $\alpha$ in the second configuration. The output of the low-pass filter 29 actuates the second actuating drive 13 and thus the steering wheel 11 in the same direction as the changes of the steering angle $\alpha$ that occur in the low-frequency component of the frequency spectrum. Because of this, it is achieved, as in the first exemplary embodiment, that above all the low-frequency changes of the steering angle α are reflected on the steering wheel 11.

In a modification of the second configuration, the control of the driver assistance system, as in the modification of the first configuration, includes a first processing branch 27 and a second processing branch 30. The function of the first processing branch 27 is identical in the modification of the first and the second configuration. Since in the second configuration with the steer-by-wire steering the movement of the steering wheel 11 is solely driven by the second actuating drive 13, the information, describing the course of the road ahead of the vehicle, that is the information from the navigation device 18 and the front camera 19, are exclusively considered or at least more strongly weighted than the information of the side cameras 20 in the second processing branch 30. Because of this, the second actuating drive 13 is actuated so that the movements of the steering wheel 11 are similar to those which the driver would perform taking into account the road in front of him.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A driver assistance system for a vehicle having a steerable wheel comprising:
    a steering assistance system configured to calculate a set point value of a steering angle for the steerable wheel and to generate a steering command based on the set point value, wherein the steering command includes a low-frequency component associated with a path of the vehicle and a high-frequency component associated with a lane position of the vehicle;
    a first actuating drive configured to receive a first control signal from the steering assistance system and to adjust the steering angle on the steerable wheel of the vehicle corresponding to the low-frequency component and the high-frequency component of the steering command;
    a steering wheel rotatably coupled to the steerable wheel; and
    a second actuating drive configured to receive a second control signal from the steering assistance system and to rotate the steering wheel based the second control signal for reproducing the low-frequency component of the steering command and reducing the high-frequency component of the steering command to eliminate a shaking movement of the steering wheel.

2. The driver assistance system according to claim 1, further comprising a steering knuckle of the steerable wheel coupled with the steering wheel and the second actuating drive by way of a superimposition gear, wherein the steering assistance system is configured to activate the second actuating drive in the direction opposite to the changes of the steering angle that occur in the high-frequency component of the steering command.

3. The driver assistance system according to claim 2, wherein the steering assistance system comprises a unit for calculating a set point value of the steering angle and a high-pass filter, the input of which receives the set point value of the steering angle and the output of which is connected to the second actuating drive.

4. The driver assistance system according to claim 2, further comprising:
    a first source of information connected with the steering assistance system for supplying information regarding the vehicle path;
    a second source of information connected with the steering assistance system for supplying information regarding the lane position; and
    a first processing branch configured to generate the steering commands by way of the information of the first and the second source; and
    a second processing branch configured to control the second actuating drive, which weighs the information of the first source relative to the information of the second source less favorably than the first processing branch.

5. The driver assistance system according to claim 4, wherein the first source of information comprises at least one of a navigation system and a camera for supplying information regarding a road course in front of the vehicle.

6. The driver assistance system according to claim 4, wherein the second source of information comprises an ambience sensor for supplying information regarding the lane position of the vehicle relative to a shoulder of the road.

7. The driver assistance system according to claim 6, wherein the ambience sensor comprises at least one of a camera and a radar sensor.

8. The driver assistance system according to claim 1, wherein the steering assistance system is configured to actuate the second actuating drive in the same direction as the changes of the steering angle that occur in the low-frequency component of the frequency spectrum.

9. The driver assistance system according to claim 8, wherein the steering assistance system further comprises a unit for calculating a set point value of the steering angle and a low-pass filter having an input receiving the set point value of the steering angle and an output operably coupled to the second actuating drive.

10. The driver assistance system according to claim 8, further comprising:
    a first source of information connected to the steering assistance system for supplying information regarding the vehicle path;
    a second source of information connected to the steering assistance system for supplying information regarding the lane position of the vehicle;
    a first processing branch configured to generate the steering commands by way of the information of the first source and of the second source; and
    a second processing branch for controlling the second actuating drive, which weighs the information of the second source relative to the information of the first source less strongly than the first processing branch.

11. The driver assistance system according to claim 10, wherein the first source of information comprises at least one of a navigation system and a camera for supplying information regarding the vehicle path.

12. The driver assistance system according to claim 10, wherein the second source of information comprises an ambience sensor for supplying information regarding the lane position of the vehicle.

13. The driver assistance system according to claim 12, wherein the ambience sensor comprises at least one of a camera and a radar sensor.

14. The driver assistance system according to claim 1, further comprising;
- a sensor connected to the steering assistance system for detecting the steering wheel being touched by a driver;
- wherein a normal position of the steering wheel is preset as a function of the steering angle, and the steering assistance system is configured to gradually reduce a deviation between an actual turning position of the steering wheel and the normal position when the steering wheel is touched.

15. A computer program product which comprises instructions which when executed on a computer enable the same to work as steering assistance system in a driver assistance system according to claim 1.

16. A non-transitory computer-readable medium on which program instructions are recorded which enable a computer to operate as steering assistance system in a driver assistance system according to claim 1.

* * * * *